(12) United States Patent
Haot et al.

(10) Patent No.: US 8,005,345 B2
(45) Date of Patent: Aug. 23, 2011

(54) METHOD AND SYSTEM FOR DYNAMIC CONTROL OF DIGITAL MEDIA CONTENT PLAYBACK AND ADVERTISEMENT DELIVERY

(75) Inventors: Maxime G. G. Haot, New York, NY (US); Richard G. Moore, Cedar Rapids, IA (US); Sreenivas Rachamadugu, Leesburg, VA (US)

(73) Assignees: Verizon Business Network Services Inc., Basking Ridge, NJ (US); Verizon UK Limited, Berkshire (GB)

( * ) Notice: Subject to any disclaimer, the term of this patent is extended or adjusted under 35 U.S.C. 154(b) by 1242 days.

(21) Appl. No.: 11/517,006

(22) Filed: Sep. 7, 2006

(65) Prior Publication Data

US 2008/0219638 A1    Sep. 11, 2008

Related U.S. Application Data

(60) Provisional application No. 60/714,674, filed on Sep. 7, 2005.

(51) Int. Cl.
*H04N 9/80* (2006.01)
(52) U.S. Cl. .................... 386/249; 386/248
(58) Field of Classification Search .............. 386/46, 386/68, 67, 95, 124, 248, 249, 250, 251, 386/262, 332; 725/32, 36
See application file for complete search history.

(56) References Cited

U.S. PATENT DOCUMENTS

| | | | |
|---|---|---|---|
| 2003/0044162 A1* | 3/2003 | Angel | 386/55 |
| 2004/0133467 A1* | 7/2004 | Siler | 705/14 |
| 2006/0161635 A1* | 7/2006 | Lamkin et al. | 709/217 |

* cited by examiner

*Primary Examiner* — Robert Chevalier

(57) ABSTRACT

An approach provides control of digital media. A stream of digital media that includes an advertisement is received. The stream is selectively skipped to avoid the advertisement. In addition, the amount of advertisement played back is tracked. Further, tracking information is generated based on the tracking.

15 Claims, 8 Drawing Sheets

METHOD AND SYSTEM FOR DYNAMIC CONTROL OF DIGITAL MEDIA CONTENT PLAYBACK AND ADVERTISEMENT DELIVERY

RELATED APPLICATIONS

This application is related to, and claims the benefit of the earlier filing date under 35 U.S.C. §119(e) of U.S. Provisional Patent Application (Ser. No. 60/714,674), filed Sep. 7, 2005, entitled "Method and System for Supporting Media Services," and is a continuation-in-part of U.S. application (Ser. No. 11/475,603), filed Jun. 27, 2006, entitled "Database System, Particularly For Multimedia Objects," which is a continuation of U.S. patent application (Ser. No. 10/311,903), filed Feb. 13, 2003, entitled "Database System, Particularly for Multimedia Objects," which is a national stage application of PCT/GB01/02857 filed Jun. 27, 2001; the entireties of which are incorporated herein by reference.

BACKGROUND OF THE INVENTION

The media or broadcast industry has traditionally been confined to technologies that are expensive and an inflexible with respect to editing, production and delivery of media (e.g., video). By contrast, the communications affords great flexibility in terms of providing users with alternative networks and rich communication and entertainment services. In addition, the cost of equipment, from networking elements to end user equipment, follows a downward trend as advancements are made; for example, cellular phones are ubiquitous because of their affordability. The capabilities of these devices continue to evolve at a rapid pace; e.g., cellular phones are now equipped with high resolution displays and advanced processors to support sophisticated applications and services. Further, broadband data communications services have enabled transmission of bandwidth intensive applications, such as video broadcasts (e.g., web casts). The transformation of the communications industry has in turn influenced the media industry to rethink their business models and technological approaches.

However, in adopting these advances in communication technologies, the media industry faces a number of challenges. For instance, the issue of convergence of a broadband rich media experience and live television production and delivery needs to be addressed. Also, the demands of supporting real-time news, video on demand, user personalization, and continuing creative additions to initial systems pose additional engineering challenges. Further, delivery of interactive media (which describe real events in the real world in real-time) requires the capability to quickly acquire, store, edit, and composite live and other descriptive media by numerous users, e.g., editors, artists, and producers.

Based on the foregoing, there is a clear need for approaches that enable rapid processing and delivery of digital media.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

An apparatus, method, and software for providing controlling playback of digital media are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various embodiments of the present invention are described with respect to the Motion Picture Expert Group (MPEG) standards and Group of Pictures (GOP) technologies, it is contemplated that these embodiments have applicability to other equivalent video encoding standards and technologies.

Figure 1:
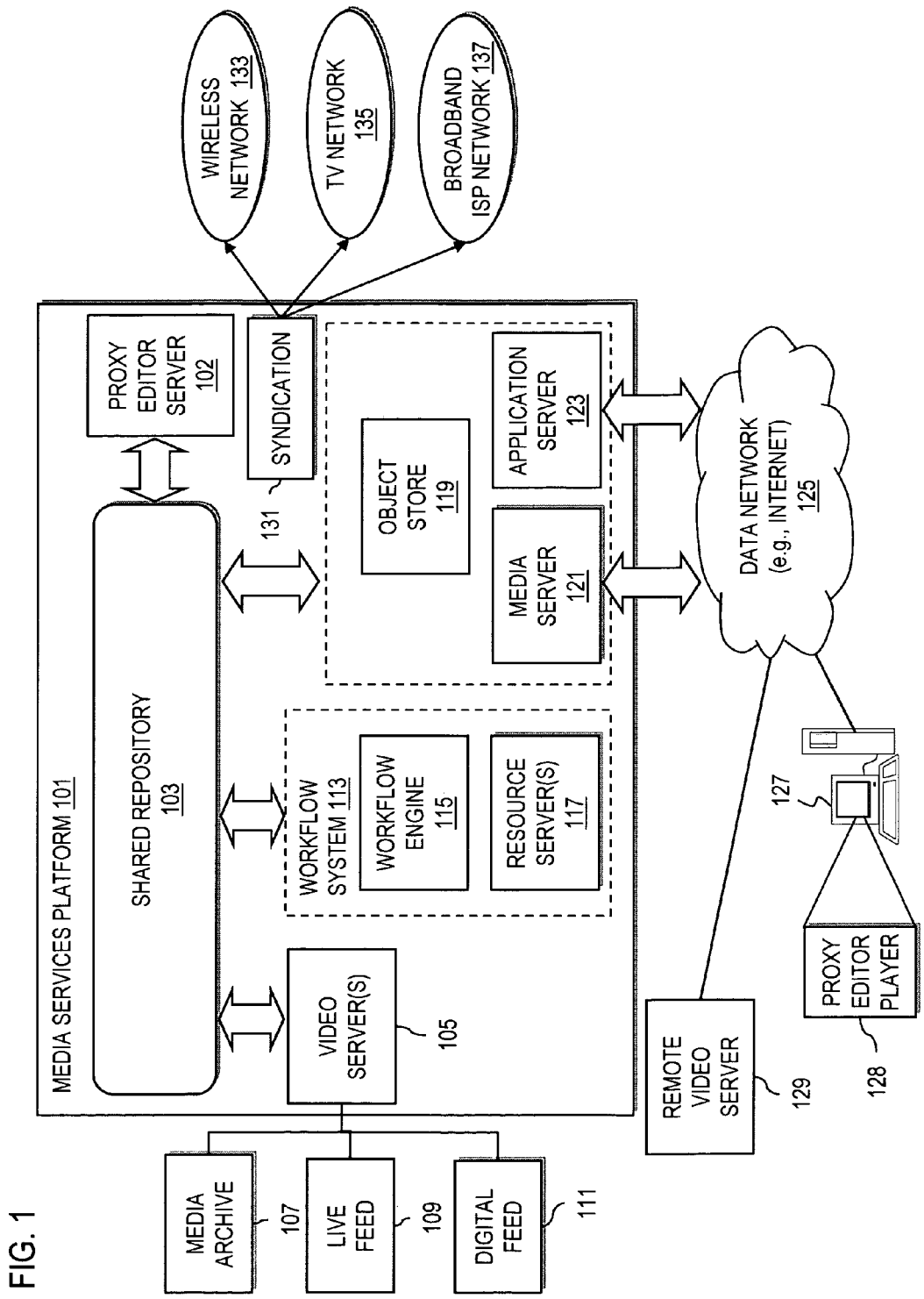
FIG. 1 is a diagram of a media services platform for supporting distributed editing and storage of digital media, according to one embodiment of the present invention.

FIG. 1 is a diagram of a media services platform for supporting distributed editing and storage of digital media, according to one embodiment of the present invention. The media services platform 101 provides an integrated media asset management platform with a fully modular architecture that enables users (e.g., customers, subscribers, etc.) to deploy the platform on a module-by-module basis as well as workflow-by-workflow. Media asset management functions include archiving, mastering of long-form content for video-on-demand (VOD) distribution, digital content aggregation and distribution. The platform 101 also supports remote proxy editing using a proxy editing application as executed by a proxy editor server 102, thereby permitting fast-turnaround broadcast productions. The editing application utilizes low-resolution version of the video content for the purposes of editing; hence, the editing application is referred to as a "proxy editor." To support the above features and functions, the media services platform 101 enables multi-channel distribution of digital content to any variety and number of devices and networks—e.g., wireless mobile devices, broadband, Internet Protocol Television (IPTV), and traditional TV platforms—thereby, reducing costs and increasing revenue over conventional systems. The architecture of the media services platform 101, according to one embodiment of the present invention, supports compact to enterprise-scale deployments, and ensures that storage and processing capabilities are robust and scalable, suitable for mission-critical broadcast operations.

It is recognized that there is an increasing need for professional, cost-effective editing of video feeds, such as television coverage of news or entertainment events, wherein the edited files can be provided over different alternative networks. For example, a user of a video enabled mobile cellular telephone might subscribe to a service that provides highlights of selected sporting events. Similarly, a user might subscribe to a sports headlines service, and receive files on a computer connected to a public data network, such as the global Internet. The real time delivery of events such as sports footage, interviews and edited highlights presents problems in such contexts, where it is necessary to produce compressed files to reduce the bandwidth for transmission over a cellular telephone network or a data network. Video files for such purposes need to be produced in an encoded format using, for instance, Group of Picture (GOP) technology, otherwise the raw digital stream would render timely transmissions and file storage impractical.

Thus, a video stream is created to include a sequence of sets of frames (i.e., GOP). By way of example, each group, typically 8 to 24 frames long, has only one complete frame represented in full. This complete frame is compressed using only intraframe compression, and thus is denoted as an I frame. Other frames are utilized and include temporally-compressed frames, representing only change data with respect to the complete frame. Specifically, during encoding, motion prediction techniques compare neighboring frames and pinpoint areas of movement, defining vectors for how each will move from one frame to the next. By recording only these vectors, the data which needs to be recorded can be substantially reduced. Predictive (P) frames refer to the previous frame, while Bi-directional (B) frames rely on previous and subsequent frames. This combination of compression techniques is highly effective in reducing the size of the video stream.

With GOP systems, an index is required to decode a given frame. Conventionally, the index is only written at the end of the file once the file has completed the encoding process. As a result, no index is available until the recording is completed. The implication is that the production of an edited version of the file, for example to transmit as highlights over a cellular phone network, cannot commence until the recording is completed and this index file produced. The media services platform 101 addresses this drawback by creating a separate index file, which can be supplemental to the routinely generated index file, during the recording and encoding process; this mechanism is detailed with respect to FIG. 5.

Accordingly, the platform 101, in an exemplary embodiment, can provide remote editing over any data network (e.g., Internet Protocol (IP)-based) that can support connectivity to the proxy editor server 102, whereby editing can commence without having to wait for completion of the recording. The proxy editor application resident on the server 102 enables developers to build professional-level desktop video editing applications using, for example, the Microsoft Windows Media 9 Series platform.

The platform 101 also provides significant scalability due to decoupled storage. Conventional editing systems required direct disk access to the video file. This poses a severe scalability issue, as every editing function (e.g., play, scrub, etc.) from the editing client creates disk traffic. If the storage cannot timely respond, a conventional editing application often freezes or crashes, such a scenario is unacceptable for real time feeds. With the media services platform 101, the content is downloaded once on each client cache; thus, the centralized storage requirements are reduced by a very significant factor (depending on editing type).

As seen in FIG. 1, the media services platform 101 utilizes a shared repository 103 that stores media (e.g., digitized video) content ingested from one or more video servers 105. Ingesting involves obtaining content into the media services platform 101, and can be accomplished locally or from a remote location. In one embodiment of the present invention, the repository 103 is deployed as a shared Storage Area Network (SAN) or NAS (Network Area Storage), which has the capability for high-performance video ingest and playback. The shared SAN 103 can utilize scalable Fibre Channel switch fabric to interface with a Fibre Channel disk array and nearline tape libraries. The video servers 105, as will be more fully described in FIG. 3, can interface any type of content sources, such as a media archive 107, a live feed 109, or a digital feed 111.

The media services platform 101 includes a workflow system 113, which comprises a workflow engine 115 and one or more resource servers 117 to support editing and distribution of digital media. The automated workflow provides the ability to automate and orchestrate repetitive workflows. In particular, the workflow system 113 offers users an overview of their work and associated events; that is, the system 113 supports an application that shows the status and progress of each job and links to relevant applications that enable the users to perform their tasks and advance the project towards completion. The workflow engine 115 controls workflow jobs and dispatches them to the resource servers 117. Communication among the resource servers 117 is facilitated by, for example, Microsoft Message Queuing.

In addition to providing individual users a central point for managing their work, the workflow system 113 is also useful as a monitoring system. For example, the system 113 can support a graphical user interface (GUI) on the user side, such that users can quickly determine through visual indicators whether tasks have been completed or error conditions exist. The users (e.g., administrators) can "drill down" to view more detail. Also, jobs can be paused, restarted (from any stage), aborted and deleted from the workflow application. This capability provides users with full control over the priority of the jobs. Additionally, the system 113 can record timing information for every step of a task, thereby enabling generation of reports on delivery turnaround etc.—e.g., for Service Level Agreement (SLA) reporting.

According to one embodiment of the present invention, the media services platform 101 can be implemented with a pre-configured, standard set of common workflows. For instance, these workflows can support generic delivery of files, rendering of edits and delivery of content from the video server 105. Moreover, customizable workflows are supported, wherein the users can integrate new services.

As shown, the media services platform 101 comprises core servers, such as an object store 119, a media server 121, and an application server 123. In an exemplary embodiment, the object store 119 contains configuration information for the workflow system 113. Configuration information include, in an exemplary embodiment, parameters of every service, the capabilities of every resource server 117, the definition of workflows, and the real time status of every job. The object store 119 supports the various applications that interface with it through an object store Application Program Interface (API). According to one embodiment of the present invention, the object store 119 has an object-based database schema (e.g., Microsoft SQL (Structured Query Language) Server, for example. The media server 121 receives stream broadcasts and serves the stream on to individual user workstations using, for example, Microsoft Windows Media. The stream contains, for example, Society of Motion Picture and Television Engineers (SMPTE) timecode, enabling the stream to be used as a frame-accurate source for live logging.

The application server 123 provides dynamic web site creation and administration functions, such as a search engine, and database capabilities. In an exemplary embodiment, the application server 123 executes Microsoft Internet Information Server (IIS), and can be configured for high availability and load-balancing based on industry standard components.

The media server 121 and the application server 123 interface with the data network 125, which can be a corporate network or the Internet. The application server 123 is thus accessible by a workstation 127, which can be any type of computing device—e.g., laptop, web appliance, palm computer, personal digital assistant (PDA), etc. The workstation 127 can utilize a browser (e.g., web-based), generally, to communicate with the media services platform 101, and a downloadable applet (e.g., ActiveX controls) to support distributed video editing functionality. The browser in conjunction with the applet is referred to an editing (or editor) interface—e.g., the proxy editor player 128. The workstation 127 can also be equipped with voiceover microphone and headphones to facilitate the editing process. The proxy editor player 128 communicates with the proxy editor server 102 to enable the viewing and editing of content, including live video, remotely. Editing functionalities include immediate access to frame-accurate content, even while being recorded, full audio and video scrubbing of source clips and edit timelines over the network 125, and generation of Advanced Authoring Format/Edit Decision List (AAF/EDL) files for craft edit integration.

To connect to the media services platform 101, the workstation 127 need not require special hardware or software. As mentioned, the workstation 127 need only be configured to run a browser application, e.g., Internet Explorer, for communication over the data network 125. With this user interface, changes or upgrades to the workstation 127 are not required, as all the applications are hosted centrally at the platform 101.

In addition to the video server 105 within the media services platform 101, a remote video server 129 can be deployed to ingest content for uploading to the platform 101 via the data network 125. The video servers 105, 129 include, in an exemplary embodiment, a longitudinal timecode (LTC) reader card as well as other video interfaces (e.g., RS-422 control card, Windows Media 9 Encoder and Matrox DigiServer video card). Video editing relies on the use of timecodes to ensure precise edits, capturing all in "in points" and "out points" of the edits. An edited video can be characterized by an edit decision list (EDL), which enumerates all the edits used to produce the edited video. LTC timecodes are recorded as a longitudinal track, analogous to audio tracks. With LTC, each frame time is divided into 80 bit cells. LTC timecodes are transmitted serially in four-bit nibbles, using Manchester codes.

The video servers 105, 129 can be remotely controlled by the workstation 127. Also, these servers 105, 129 can connect to the shared SAN 103 via Fibre Channel and a file system by, e.g., ADIC™.

A syndication (or distribution) function 131 can then distribute content over various channels, such as a wireless network 133 (e.g., cellular, wireless local area network (WLAN)), a television network 135, and a broadband Internet Service Provider (ISP) network 137. Depending on the capabilities supported by the wireless or wired access network (e.g., networks 133 and 137), rich services, such as presence, events, instant messaging (IM), voice telephony, video, games and entertainment services can be supported.

Although the video server 105, the workflow engine 115, the object store 119, the media server 121, and the application server 123 are shown as separate components, it is recognized that the functions of these servers can be combined in a variety of ways within one or more physical component. For example, the object store 119, the application server 123, and the workflow engine 115 can reside within a single server; and the video server 105 and the media server 121 can be combined into a common server.

As mentioned above, the media services platform 101 enables media asset management, rapid production, and robust, cost-effective proxy editing capabilities. By way of illustration, management of media assets to support broadband video on demand (VOD) is described. One of the first tasks involved with VOD applications is ingesting full length movies into the video servers 105 for mastering and editing (e.g., removing black, stitching tapes together, adding legal notices etc). The masters are then stored on the shared SAN 103. The content is then transcoded to a high quality media stream format, such as Microsoft Windows Media 9 Series, and delivered automatically with metadata to their broadband video pay-per-view portal (e.g., any one or more of the networks 133, 135 and 137).

Additionally, the media services platform 101 can offer video archiving services. For instance, customers can extend their online storage with nearline tape and manage content seamlessly across multiple storage devices using add-on archive modules. Online storage can be backed up and/or migrated to tape according to automated policies. Advantageously, this archival approach can be transparent to the users; that is, the users are never aware that the master video is no longer stored on expensive disk-based storage. In one embodiment, a library application can be implemented with the media services platform 103 to provide seamless integration with offline video and data tape archives. Further, the media services platform 101 provides high integration with existing production workflows through its capability to transcode and deliver any content contained in the archive to, for example, popular non-linear editors (e.g., AVID™ editor).

Furthermore, the media services platform 101 enables flexible, cost-effective content aggregation and distribution, which is suitable for content service providers. Typical workflows involve aggregation of content from owners in such formats as Motion Pictures Expert Group (MPEG)-2 or Windows Media 9, along with metadata in eXtensible Markup Language (XML) files, using pre-configured File Transfer Protocol (FTP) hot folders. "Hot folders" are predefined folders that trigger a workflow event (e.g., file conversion, compression, file transfer, etc.) upon movement of files into the folder. These owners can submit content directly to the workflow system 113 for automatic transcoding, Digital Rights Management (DRM) protection and syndication to multi-channel operators.

According to one embodiment of the present invention, the media services platform 101 utilizes a unified user interface (e.g., web browser) for accessing applications supported by the platform 101. It is recognized that typical production and content delivery workflows often involve the use of multiple separate applications: one application for logging, a second application for encoding, a third one for editing, a fourth application for asset management, and so on. Consequently, the challenge of effectively managing workflows is difficult. The task is even more daunting in a multi-channel production and distribution environment, as greater elements need to coordinated and more applications have to be learned over traditional television environments.

The media services platform 101 advantageously simplifies this task by permitting access to the multitude of applications via a single unified user interface as part of a coherent workflow. In this manner, although various technologies are involved, the user experience is that of a single, user-friendly suite of tools, which shield non-technical users from the complex integration of applications and technologies.

The applications supported by the platform 101 include the following: media asset management and search, video editing, video server services, workflow, syndication, upload of media, library service, administration, quality assurance, copyright protection, music cue sheet services, and reporting. In addition, the users can develop their own applications within the unified user interface. Asset management permits users to manage the location of content within organized folder structures and categories. This capability is more fully described with respect to FIG. 4. The asset search function offers a generic search capability across the entire object store 119.

The media services platform 101 also provides a flexible and cost-effective approach for proxy logging and editing of live and archive material. Such editing services can be in support of news and sport editing, archive browsing and editing, mobile, broadband and IPTV production and mastering, and promotion production. The editing application provides viewing and logging of live feeds, frame-accurate proxy logging and editing, and remote proxy editing (e.g., utilizing Windows Media 9 Series proxy format). In addition, the editing application can support instant logging and editing while the feed is recording, as well as audio and video scrubbing. This editing application includes the following capabilities: edit timeline with effects; voiceover (while editing remotely—which is ideal for translation workflows); save edit projects with versions; generate thumbnail and metadata from within the editing user interface; and export EDL's or render finished edits ready for transcoding and delivery. With this application, a user, through an inexpensive workstation 127, can efficiently master a movie for VOD distribution, rough-cut a documentary, or create a fully-finished sports highlight video with voiceover and effects.

The media services platform 101, in an exemplary embodiment, utilizes a Windows Media 9 Series codec, which allows high quality video (e.g., DVD-quality) to be logged and edited across the data network 125. Further, the platform 101 employs intelligent caching to ensure that the applications are as responsive as editing on a local hard drive, even over low-bandwidth connections; the caching architecture is described below with respect to FIG. 6.

The syndication application automates the creation and delivery of content and metadata to very specific standards for a range of target systems without manual intervention.

The upload application allows users to ingest digital files into the media services platform 101 and submit them to any permitted workflow. The users (with administrative responsibilities) can control which file types are allowed, which workflows are compatible, and the way in which different types of content are processed. The upload application can facilitate submission of the files to automatic workflows for hands-off end-to-end processing as well as to manual workflows that require manual intervention.

The upload application is complemented by a hot folder system, wherein workflow activities are automatically initiated upon movement of files into and out of the hot folders. The file system folders can be pre-configured to behave like the upload application and pass files of particular types to the workflows. Metadata for each asset provided in accompanying XML files can be acquired and mapped directly into the object store 119.

The reporting application enables users to create "printer-friendly" reports on any information stored in the object store 119. The reporting application is pre-configured with a number of default reports for reporting on content delivery. Users can filter each report by selecting a desired property of the data, e.g., subscription name, or start and end date. Through the API of the media services platform 101, users (and system integrators) can create new report templates and queries.

The library application offers the ability to manage physical media that contain instances of assets managed in the media services platform 101. Even with continuing expansion in the use of digital media, traditional media continue to play an important role. Typical production environments possess a number of video tapes, DVDs or other physical media for storing content and data. Some environments utilize large established archives.

In mixed media environments, it is beneficial to manage digital and physical instances of content in an integrated manner. Accordingly, the library application provides the following capabilities. For example, the application permits the user to generate and print barcodes for the physical media and shelves, with automatic naming as well as bulk naming (with configurable naming conventions). Also, barcodes are employed for common actions, thereby allowing completely keyboard-free operation for checking in/out and shelving of the physical media. The library application additionally can manage items across multiple physical locations, e.g., local and master libraries. Further, the application supports PDA-based applications with a barcode scanner for mobile checking in/out and shelving. The library application advantageously simplifies management of multiple copies of the same asset on several physical media and storage of multiple assets on the same tape or DVD. The library application can further be used in conjunction with robotic tape libraries to track tapes that have been removed and shelved.

Moreover, the media services platform 101 provides an administration function to tailor system configuration for different customers. It is recognized that a "one size fits all" configuration for all users is non-existent. That is, each user, department, organization and customer has its own set of requirements. Therefore, the media services platform 101 supports concurrent use of multiple configurations. For example, each deployment can configure to its own user groups, create new workflows, integrate new services, support new content types, and specify new output media formats. The customer can also change and add metadata structures and fields, and integrate existing web-based applications into the user interface. The above capabilities can be executed, via the administration application, with immediate effect without shutting down the platform 101. Additionally, in a multi-department deployment scenario, multiple logical instances of the media services platform 101 can be configured with their own unique configurations.

According to one embodiment of the present invention, the media services platform 101 can be implemented as a turn-key system within a single box—e.g., in-a-box flight case. Under this configuration, there is no need for a costly and time-consuming IT (information technology) integration undertaking to rack the components or integrate them into the customer's network. Under this arrangement, the platform 101 is be configured as a plug-and-play system, connecting to the network automatically.

Figure 2A:
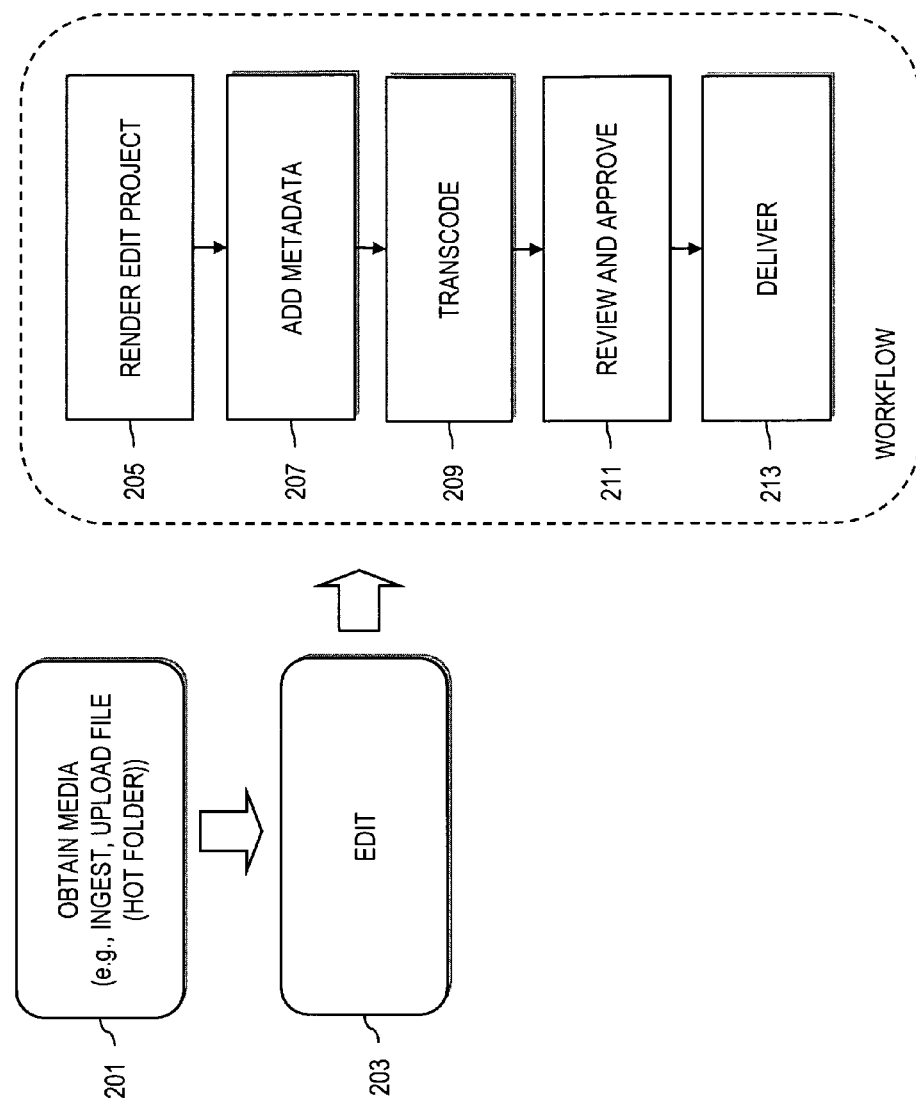
FIGS. 2A and 2B are, respectively, a diagram of a workflow process utilized in the system of FIG. 1 to edit digital media, and a flowchart of process for controlling playback of the digital media and advertisements, according to one embodiment of the present invention.

FIG. 2A is a diagram of a workflow process utilized in the system of FIG. 1 to edit digital media, according to one embodiment of the present invention. For the purposes of explanation, the workflow capability of the media services platform 101 is described with respect to the video editing application. In step 201, the media that is to be edited is obtain; the media can undergo an ingest process or simply exists as a digital file that can be uploaded (using the upload application as earlier explained). Ingesting is the process of capturing content into the media services platform 101 and can occur locally or remotely with respect to the platform 101. If uploaded, the user delivers the project to selected hot folders that automatically define categorization.

The media is then edited, per step 203. By way of example, the user, utilizing the proxy editor player 128 (which is the counterpart software to the proxy editor supported by the media services platform 101) on the workstation 127, can select and log the feed (assuming a live feed which is always visible), either marking in and out points manually or using an auto-clip feature for rapid logging. The user can also insert commentary and assign a rating to the video for determining which segment of the content is the most compelling content, thereby providing an indication of the selected clips that should be edited. During or after logging, the user can select clips from the log and use the proxy editor player 128 to trim the selection. For example, the user can jog and shuttle along a timeline, or utilize a mouse wheel to scroll frame by frame to the desired cut point. The user can then preview the selection before placing it on the edit timeline. Thereafter, the user can manipulate the clips on the timeline, reorder and trim the selections. The proxy editor player 128 can permit the user to apply zoom and crop effects to close in on areas of interest; this capability is particularly valuable for broadband or mobile outputs where detail is important. The user can record a voiceover directly onto the timeline, thereby completing the edit.

The edit is then rendered, as in step 205, as part of a workflow. In an exemplary embodiment, the edit is rendered using a high-resolution MPEG-2 master. Alternatively, an associated EDL is delivered to an integrated craft edit for completion. The media services platform 101 can support various workflows for craft editor integration, such as, store and forward, and instant editing. As for the store and forward approach, the content can be viewed, logged and edited using the proxy editor into packages for automated transcoding (from master MPEG-2) and delivery to popular non-linear editing systems (e.g., AVID Unity and AVID Media Composer, Adobe Premiere, Apple Final Cut Pro, Media 100, iFinish, Pinnacle Liquid and Vortex). With respect to instant editing, using the proxy editor player 128, the user can execute an ingest of a live feed, which can be viewed, logged and edited. The user can then export an EDL to a craft editor, which can be a third party craft editor (e.g., Incite Editor E3) that is integrated with the media services platform 101. When imported into Incite, the timeline is rebuilt frame-accurately, pointing to the MPEG-2 master on the shared SAN 103. Once the edit is complete, the craft editor creates a new MPEG-2 digital master, which is automatically re-ingested back into the platform 101 when dropped in an appropriate Hot Folder.

It is noted that the above process can occur while the video feeds are still being recorded, thus enabling the quickest possible turnaround of content for broadcast programs (e.g., sports and news).

In step 207, metadata is added. The file is transcoded (per step 209) and reviewed and/or approved (step 211). Thereafter, the edited filed is delivered, per step 213. The last stage in the workflow is the delivery of content files and metadata to other systems (e.g., networks 133, 135, and 137) that are responsible for delivery of content to consumers. The syndication application of the media services platform 101 provides the automated delivery of the content and metadata. The media services platform 101 operates on a "set it and forget it" principle. In other words, once a configuration is specified, no other input is required thereafter. For instance, a configuration of a new subscription is set to the required content categories, the technology used to create each file as well as the specific set of parameters are specified, and the file-naming conventions and delivery details are indicated. Every subsequent delivery from the workflow application simply implements the subscription when the correct criteria are met. Whenever the user requires a new output format, the user can specify the various configuration parameters, including the codec, frame rate, frame size, bit rate, and encoder complexity.

It is noted that any technology plugged into the workflow system 113 can be automated—e.g., for pre-processing, transcoding, DRM protection, watermarking, delivery, or any other purpose required.

The above workflow process can be illustrated in the following example involving a sports production. Under this scenario, a customer produces, on a weekly basis for instance, multiple fully-edited football match highlights every week for mobile operators (utilizing Third Generation/Universal Mobile Telecommunications System (3G/UMTS) technologies). The customer requires a two minute voiced highlight package be delivered to the operators within 4 minutes of the end of each game for these concurrent matches. This requirement can be achieved with the media services platform 101, whereby live broadcast feeds are recorded using the video servers 105. Producers edit and log the media using the proxy editor application (e.g., player 128) during recording of the matches. Once the matches are over, they simply select a deliver button presented by the proxy editor player 128. The workflow system 113 automatically renders the proxy edit using, for instance, a MPEG-2 50 Mbps I-frame master, before automatically transcoding the edit into the mobile formats requested by the operators and delivering the content and metadata XML to their content distribution networks. In this manner, the mobile subscribers can purchase and view the video clips on their mobile handsets within minutes of the end of each game.

According to one embodiment of the present invention, the media services platform 101 can be integrated with a newsroom computer system and playout video server. The video server 105 ingests content from live feeds or tape, and journalists and producers throughout the news organization can instantly start to log and edit the live feeds from their desktop using the proxy editor player 128. Finished edits are rendered and transcoded direct from the proxy editor application to a gallery playout video server. Notification is automatically sent to the newsroom computer system and automation system when every new package is available.

Figure 2B:
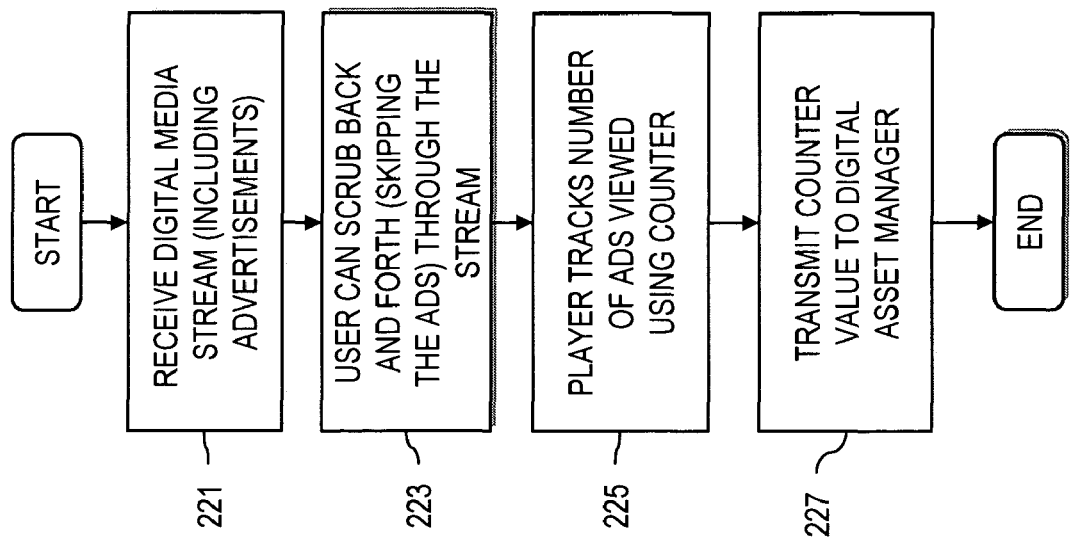

FIG. 2B is a flowchart of a process for controlling playback of digital media and advertisements, according to one embodiment of the present invention. A proxy editor player 128, as in step 221, retrieves a digital media stream including advertisements. The advertisements can be inserted by a service provider or owner of the platform 101, as well as any user that "subscribes" to the services of the platform. It is noted that with the editing capabilities of the media services platform 101, any user can become an advertisement publisher in that the user can create a video with advertisements for publishing through the syndication application. The advertisement publisher capability that is provided to the users is further detailed later in FIG. 4.

Upon receipt of the digital media stream, with the proxy editor player 128 the user can scrub back and forth through the digital media stream. With this functionality, the user can readily skip through advertisements. However, the player 128 can maintain the number of advertisements that have been viewed by the user using a counter (step 225). The counter can be triggered to increment based on a predetermined duration of viewing (e.g., the advertisement must be played for at least 75% of its length). The counter value is then transmitted, as in step 227, to the digital asset manager 102 for accounting purposes. In addition, the player 128 can track the length of playback of an advertisement; such tracking information can be submitted to the platform 101.

Figure 3:
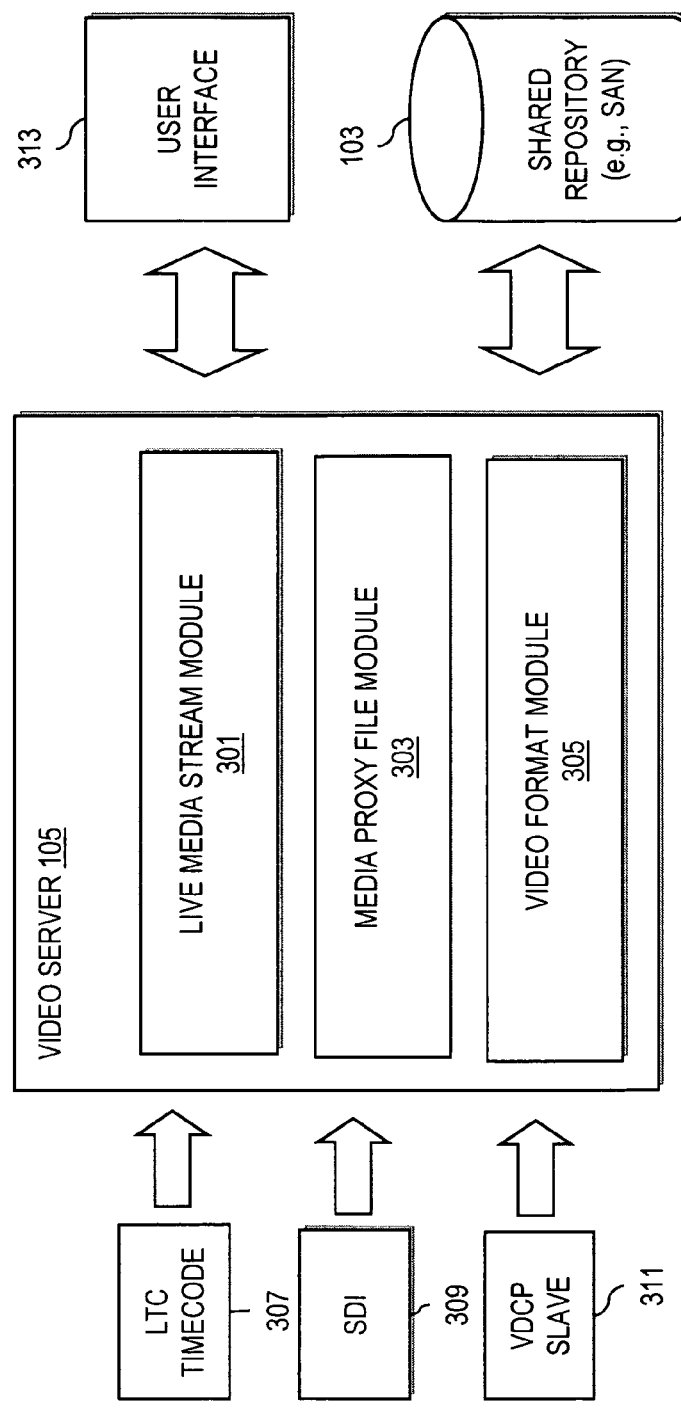
FIG. 3 is a function diagram of a video server in the system of FIG. 1, according to one embodiment of the present invention.

FIG. 3 is a function diagram of a video server in the system of FIG. 1, according to one embodiment of the present invention. As mentioned, the video server 105, among other functions, is capable of handling live broadcast video in a flexible, feature rich and cost-effective manner. In this example, the video server 105 can be slaved by a Video Disk Communications Protocol (VDCP)-compliant automation system. It is noted that the video server 105 can support both National Television System Committee (NTSC) and Phase Alternating Line (PAL) standards. The video server 105 is controllable from any user workstation (e.g., workstation 127) without geographical constraint. The video server 105 can in turn control, for instance, an attached video tape recorder (VTR) over an RS-422 interface, thereby allowing frame-accurate recording and lay back to tape, and preserving timecode through the entire process.

In one embodiment, the video server 105 includes a live media stream module 301, a media proxy file module 303, and a video format module 305. The live media stream module 301 communicates with the user interface 313 to provide logging and monitoring functions. The media proxy file module 303 supports the capability to perform editing functions during recording of the video. The video format module 305 converts a raw video stream into a standardized format—MPEG-2, for example. The modules 303 and 305 interface the repository 103 to store the ingested contents.

As shown, the server 105 can support various input sources: an LTC time code source 307, a Serial Digital Interface (SDI) source 309, and a VDCP slave source 311. The video server 105 can generate multiple outputs in real-time from the SDI source 307, in contrast to conventional video servers which generate only a single output. The modules 301, 303, 305 generate three types of outputs. One output is that of MPEG-2, in which the user can select between long-GOP and I-frame for each server, ranging from DVD-quality 5 Mbps long-GOP to 50 Mpbs I-frame only. The audio is captured at 48 kHz, for instance. The live media stream module 301 can generate a live media stream (e.g., Windows Media 9 Series) for broadcast over a network (e.g., networks 133-137 of FIG. 1) to one or more media servers (e.g., media server 121), which serve the stream on to individual user workstations. The stream can include SMPTE timecode, thereby providing a frame-accurate source for live logging.

Finally, the media proxy file module 303 can produce a file (e.g., Windows Media proxy file) for storage in the SAN 103. The proxy editor permits this file, according to one embodiment, to be opened for viewing and editing while the file is still being written. Thus, in conjunction with the proxy editor, the video server 105 supports fast-turnaround production of live events without the need for dedicated high-bandwidth networks and expensive edit suites, and without sacrificing quality or functionality.

In addition to the robust video editing functionality, the media services platform 101 provides management of the digital assets, as next explained.

Figure 4:
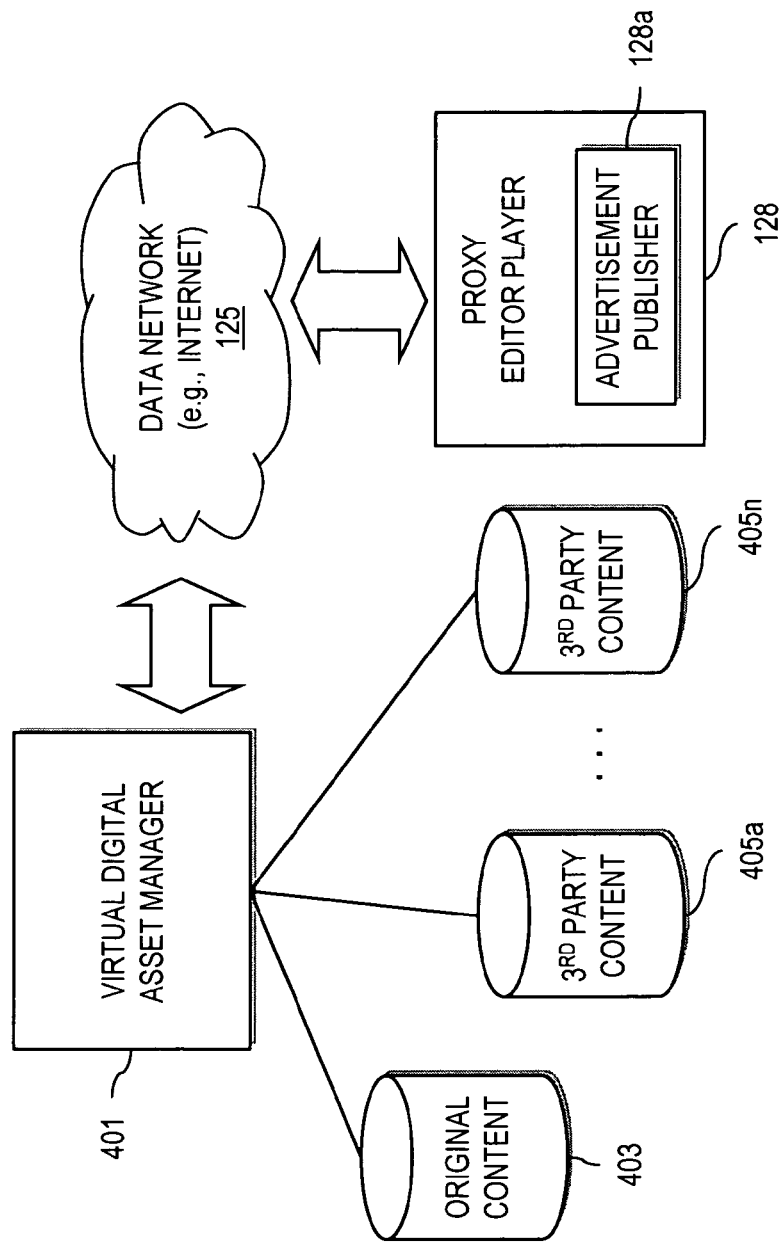
FIG. 4 is a diagram of virtual digital asset manager (VDAM) for storing digital media, according to an embodiment of the present invention.

FIG. 4 is a diagram of virtual digital asset manager (VDAM) for storing digital media, according to an embodiment of the present invention. The virtual asset manager 401 (e.g., object store 119) ensures that the digital archive can be fully integrated into the production workflow, including desktop proxy viewing, logging and editing, craft editing, and delivery. For example, sections of an archive MPEG-2 master can be selected using a low-resolution proxy and exported to an AVID editor or AVID Unity (the files can be transcoded and delivered automatically via Telestream FlipFactory).

The library application, as earlier described, provides physical asset management (e.g., tape check-in, check-out, shelving and barcode printing, etc.) to connect physical tape content with its digital equivalent stored in the repository 103.

The asset manager 401 enables frame-accurate remote browsing, logging and selection of thousands of hours of archive content from anywhere on the Internet or a private corporate WAN (e.g., data network 125). The asset manager 401 allows users to manage the location of content within organized folder structures and categories. Content can be modified, deleted, copied, pasted and added through this application. Folders can store any asset type configured by administrators, from audio and video to ringtones, images and documents.

The asset manager 401 also offers a flexible search capability for the object store 119. Users can search across their own work and that of others, thus facilitating sharing and simple retrieval of content. Further, other applications within the media services platform 101 can utilize this asset search capability, as to provide a consistent and recognizable function (i.e., common dialog) across these applications.

The object store 119 enables the asset management capability of the media services platform 101, permitting users (e.g., administrators) to change the fields and forms associated with an asset at any point by utilizing the proxy editor player 128. Under this approach, adapting the platform 101 to satisfy changing user requirements does not require expensive database administrators.

The proxy editor player 128, as noted, can behave as an advertisement publisher 128a. An exemplary scenario involves a user, who is a subscriber to the platform 101, creating a video that is to be published. The user can also generate advertisements to accompany the video. Through the media services platform 101, the user can publish the resultant work. The platform 101 can track viewing of the work and produce other accounting information on behalf of the user.

In this example, the virtual digital asset manager 401 accumulates content from a variety of content databases 403 and 405, and thus is considered "virtual." A customer can generate its own content, which can be stored in the original content database 403. In addition, the content of one or more third party content providers can be offered by the asset manager 401. Accordingly, the VDAM 401 enables tying of business partners (e.g., third party content providers), thereby enhancing the distribution of digitized assets. In an exemplary embodiment, the content owner can push content into the virtual digital asset manager 401 over the world wide web (e.g., network 125). The virtual digital asset manager 401 can also provide private storage of asset data, and facilitate publishing of the content. In addition to being configured as an asset manager, the VDMA can act as a directory server of all the assets provided by users.

Furthermore, it is contemplated that the virtual digital asset manager 401 can provide advertisement and transaction support. That is, a user can produce a video file that includes the stored content as well as advertisements; the manager 401 then tracks transactions relating to the retrieval and/or viewing of the edited video file. In this manner, the customer has the capability to charge or otherwise account for such services.

Effectively, the VDAM supports a "most needed" based approach, rather than a "most requested" based approach of convention systems. In accordance with one embodiment of the present invention, the virtual digital asset manager 401 can be implemented external to the media services platform 101 as an independent system.

Figure 5:
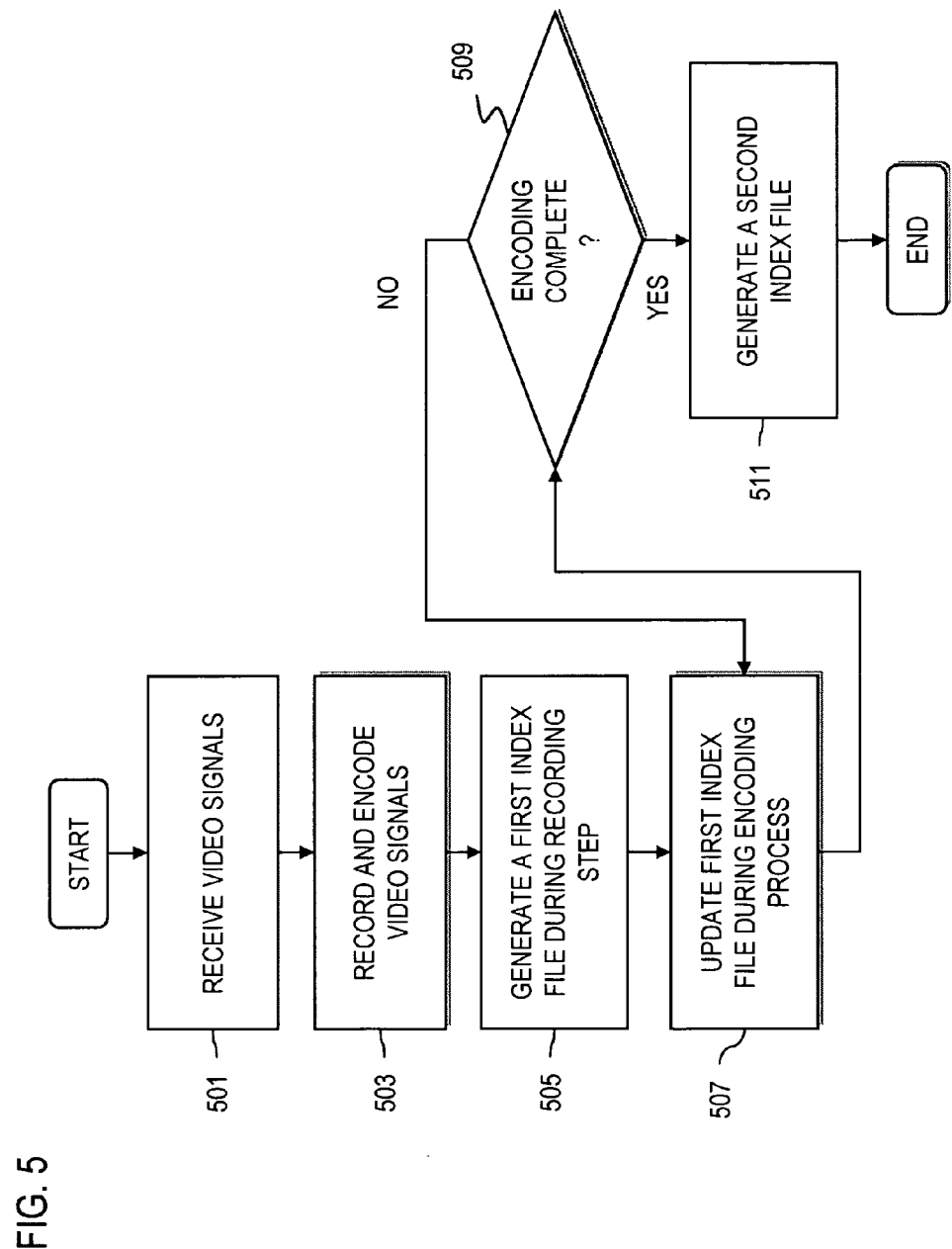
FIG. 5 is a flowchart of an indexing process to enable distributed editing over a data network, according to an embodiment of the present invention.

FIG. 5 is a flowchart of an indexing process to enable distributed editing over a data network, according to an embodiment of the present invention. Conventionally, to support editing, an index file is generated for addition to the end of the video file. The media services platform 101 provides a mechanism, whereby during recording and encoding of a video file, editing can be concurrently performed. This is enabled by created of a supplemental index file that is separate from the conventional index file. The separate index file is updated dynamically at intervals during recording and encoding. This index can be added to the video file when recording and encoding has been completed; optionally, the separate index file can then be deleted. Video frames for use in the editing process are created using data in the video file and the separate index file.

In step 501, video signals are received by the platform 101; namely, through the video server 105. The video signals are then recorded and encoded, as in step 503. In step 505, the first index file is generated during the recording. This first index file is updated during the encoding process (step 507). In other words, while the video file is being recorded and subjected to encoding (e.g., GOP encoding), a separate index file is created and updated at regular intervals during the encoding process. Typically, the updating of the index file can occur every half a second. If the encoding process is complete (as determined in step 509), then a second index file (i.e., conventional index file) is generated, as in step 511. Otherwise, the update of the first index file is continued.

If the editing application attempts to connect to a video file and cannot locate the index at the end of the file, the application will look automatically for the separate index file. The index file could be assigned the same name as the basic video (or media) file, but with a different extension—although mapping to any name of file could be used. If an appropriate index file (which can indicate a different file extension than the video file) is found, the editor uses this external index to play/render the file, which is still being recorded. This results in the editor being able to access content rapidly (e.g., within a one second maximum of the content being recorded). Once recording stops and the conventional index is added to the end of the video file, the external index file can be deleted as no longer necessary.

The above process can be applied to any GOP based video format (including Windows Media).

Figure 6:
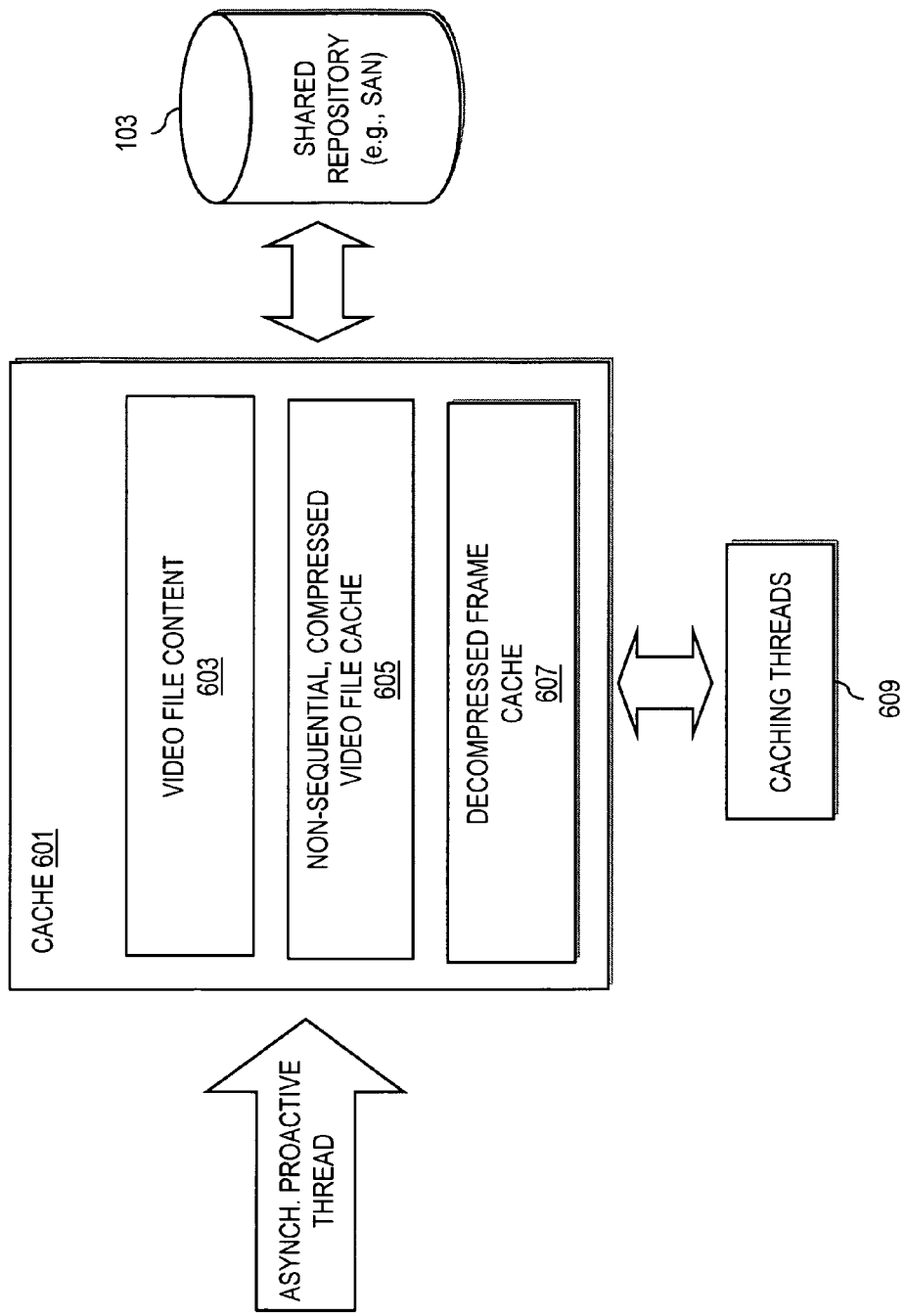
FIG. 6 is a diagram of a cache architecture for storing media, according to an embodiment of the present invention.

FIG. 6 is a diagram of a cache architecture for storing and manipulating media, according to an embodiment of the present invention. To offer the flexible, robust editing functions, a software-based, intelligent video cache system 601 is utilized. The system 601 enables frame accurate scrubbing and editing of GOP based content. Due to the processor demand in decoding GOP based content, GOP based editing has been implemented conventionally as hardware based functionality. This aspect of the present invention provides a caching architecture which removes this requirement and enables software based real-time long GOP editing. This architecture is implemented by the editing application of the media services platform 101.

The architecture of the intelligent video cache system 601 has a number of layers: a video file content layer 603; a non-sequential, compressed video file cache 605; and a decompressed frame cache 607. The video file content layer 603 provides for locally hosted video file content. The second layer 605 provides for a compressed video file cache within a client player. This cache 605 is non-sequential so that only parts of the video file (at GOP resolution) can be cached. In one embodiment, the cache 605 is maintained in main memory (e.g., Random Access Memory (RAM)) of the workstation 127, but can be aged by the player software to local disk. Also, within the client player, the decompressed frame cache 607 is provided in video memory (VRAM).

In this example, the cache 601 is filled by asynchronous proactive caching threads 609, which follow and predict user behavior patterns as well as fill the different layers 603, 605 and 607 of the cache 601 as required to provide the best editing experience (within the constraints of the local workstation resources in terms of Central Processing Unit (CPU), RAM, disk and VRAM). The asynchronous aspect of the system is significant, and provides the user with an immediate response when scrubbing throughout a file or editing. If the system has not yet cached the desired frame, the player software can show the closest cached/decompressed frame and display a status symbol indicating to the user that the current frame is not the correct frame. If the user waits, eventually that frame will render into the correct frame. The user interface is not locked by the caching mechanism—i.e., the user can always choose to scrub somewhere else, play, etc. Furthermore, cache requests can be configured to have an expiry timeout, enabling cancellation to avoid building long queues of caching requests (which could no longer be relevant).

The following modes of operation of the editor player 128 are considered: idle, scrubbing, and playing. In idle mode, when the player has not changed state within a predetermined period of time (e.g., such as in the last 2 seconds), a playback caching thread first ensures that it has cached the next few seconds forward and backward from the playback head position. The thread ensures that the content is cached in decompressed VRAM cache 607. In this manner, if the user suddenly decides to play, the system can respond immediately. Once the playback caching thread is satisfied that the content is cached for immediate playback, the riddling thread is started.

The job of the riddling thread is to proactively download frames throughout the video in case the user starts scrubbing. The thread first downloads a GOP in the middle of the file, then every third of the file, then every ninth of the file, etc. This continues until the VRAM is full (it always leave the playback thread immediate playback content, but can replace other frames which have been cached and are no longer relevant). Once the VRAM is full, the thread continues—but only to the compressed RAM cache and disk cache. If enough resources exist on the workstation 127 and time is left in idle mode, the full video can be cached in the compressed cache.

The scrubbing mode is triggered by fast "playback head" movement, by a user operating an on screen editing tool (when not in play mode). The playback caching thread is disabled and all resources are given to the riddling thread to provide the best scrubbing experience.

When a play "button" is selected by a user within the proxy editor player 128, the playing mode is triggered. In this mode, the playback caching thread, and the riddling thread are disabled. A look-ahead caching thread is started which decompresses into VRAM the content ahead, and faster (if there are sufficient system resources) than the playback head.

The processes described herein for supporting distributed editing may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
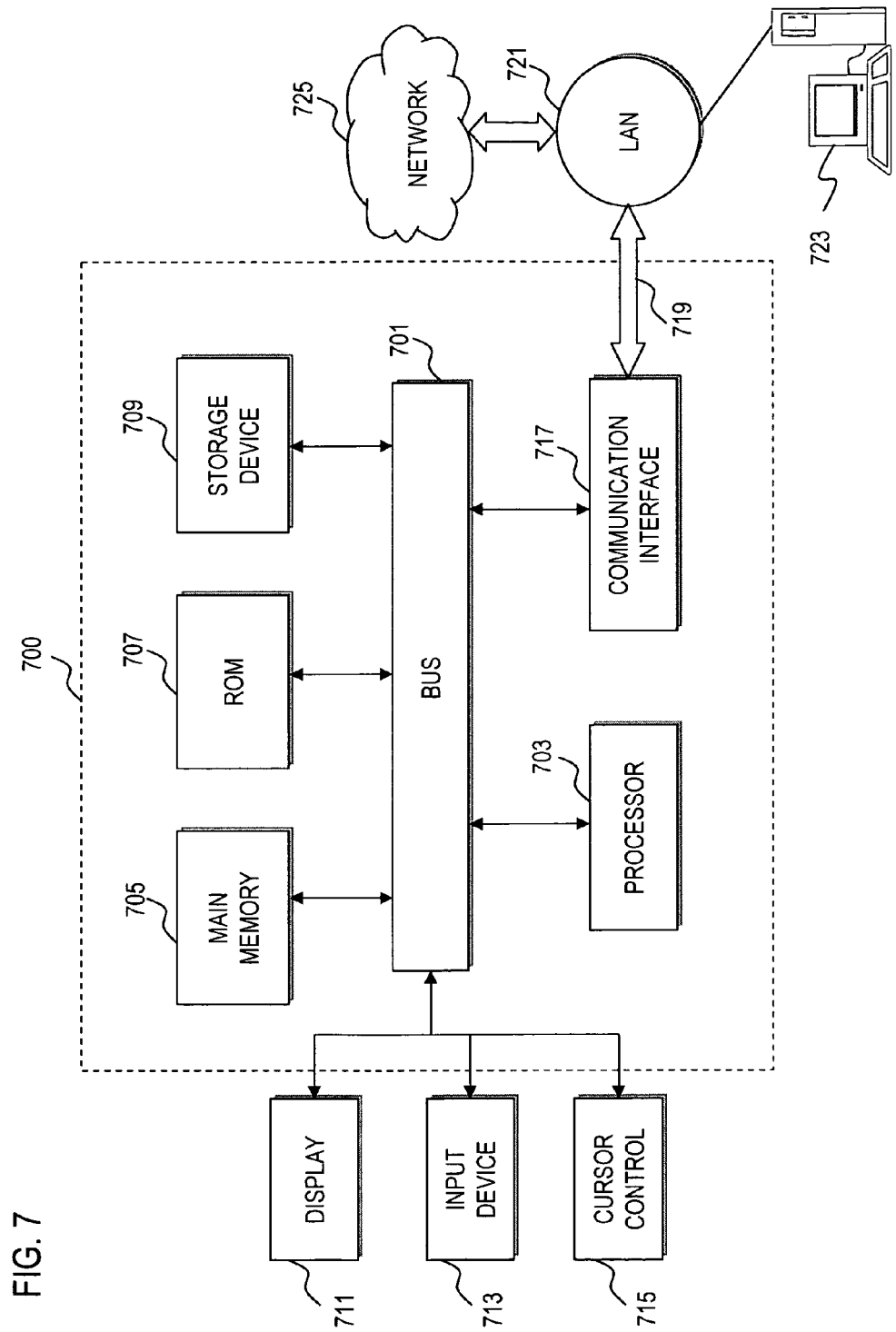
FIG. 7 is a diagram of a computer system that can be used to implement various embodiments of the present invention.

FIG. 7 illustrates a computer system 700 upon which an embodiment according to the present invention can be implemented. For example, the processes described herein can be implemented using the computer system 700. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to one embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the present invention. Thus, embodiments of the present invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the present invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

The following patent applications are incorporated herein by reference in their entireties: co-pending U.S. patent application Ser. No. 11/368,750, filed Mar. 6, 2006, entitled "Method and System for Providing Distributed Editing and Storage of Digital Media Over a Network"; co-pending U.S. patent application filed Sep. 7, 2006, entitled "Method and System for Providing a Personal Video Recorder Utilizing Network-Based Digital Media Content"; co-pending U.S. patent application filed Sep. 7, 2006, entitled "Method and System for Providing Remote Digital Media Ingest with Centralized Editorial Control"; co-pending U.S. patent application Ser. No. 11/452,851, filed Jun. 14, 2006, entitled "Method and System for Providing Digital Media Management Using Templates and Profiles"; co-pending U.S. patent application Ser. No. 11/479,715, filed Jun. 30, 2006, entitled "Method and System for Providing End User Community Functionality for Publication and Delivery of Digital Media Content"; co-pending U.S. patent application filed Sep. 7, 2006, entitled "Digital Media Asset Management System and Method for Supporting Multiple Users"; co-pending U.S. patent application filed Sep. 7, 2006, entitled "Method and System for Delivery of Digital Media Experience via Common Instant Communication Clients"; and co-pending U.S. patent application filed Sep. 7, 2006, entitled "Providing End User Community Functionality for Publication and Delivery of Digital Media Content."

APPENDIX

| | |
|---|---|
| 3G | 3$^{rd}$ Generation |
| AAF | Advanced Authoring Format |
| API | Application Programming Interface |
| ASIC | Application Specific Integrated Circuit |
| CD | Compact Disc |
| CPU | Central Processing Unit |
| CRT | Cathode Ray Tube |
| DSL | Digital Subscriber Line |
| DRM | Digital Rights Management |
| DVD | Digital Versatile Disc (formerly Digital Video Disc) |
| EDL | Edit Decision List |
| EPROM | Erasable Programmable Read Only Memory |
| FPGA | Field Programmable Gate Array |
| GOP | Group of Pictures |
| GUI | Graphical User Interface |
| IIS | Internet Information Services |
| IM | Instant Messaging |
| IP | Internet Protocol |
| IPTV | IP Television |
| ISDN | Integrated Digital Services Network |
| ISP | Internet Service Provider |
| LAN | Local Area Network |
| LTC | Longitudinal TimeCode |
| MPEG | Motion Picture Expert Group |
| NAS | Network Area Storage |
| NTSC | National Television System Committee |
| NIC | Network Interface Card |
| PAL | Phase Alternating Line |

APPENDIX-continued

| | |
|---|---|
| PCMCIA | Personal Computer Memory Card International Association |
| PDA | Personal Digital Assistant |
| PROM | Programmable Read Only Memory |
| RAM | Random Access Memory |
| ROM | Read Only Memory |
| RFC | Request For Comment |
| RPID | Rich Presence Information Data Format |
| SAN | Storage Area Network |
| SDI | Serial Digital Interface |
| SLA | Service Level Agreement |
| SMPTE | Society of Motion Picture and Television Engineers |
| SQL | Structured Query Language |
| TV | Television |
| UMTS | Universal Mobile Telecommunications System |
| VDAM | Virtual Digital Asset Manager |
| VDCP | Video Disk Communications Protocol |
| VOD | Video On Demand |
| WAN | Wide Area Network |
| WLAN | Wireless Local Area Network |
| XML | Extensible Markup Language |

What is claimed is:

1. A method for controlling digital media, the method comprising:
   receiving a stream of digital media that includes one or more advertisements;
   selectively skipping through the stream to avoid presentation of at least a portion of at least one of the one or more advertisements;
   presenting one or more portions of the one or more advertisements that are not selectively skipped;
   tracking the presented portions of the one or more advertisements via a counter that is incremented when the presented portion of a particular advertisement reaches a predetermined duration that is less than a whole duration of the advertisement; and
   generating tracking information based on the counter.

2. A method according to claim 1, further comprising:
   transmitting the tracking information to a platform configured to deliver the stream.

3. A method according to claim 2, wherein the platform is configured to provide virtual digital asset management of the digital media for operation with a workflow application, and the workflow application includes proxy viewing, logging and editing, craft editing, and delivery of the digital media.

4. A method according to claim 1, wherein the digital media represents a live feed.

5. An apparatus for controlling digital media, the apparatus comprising:
   a communication interface configured to receive a stream of digital media that includes one or more advertisements; and
   a processor coupled to the communication interface and configured to,
      selectively skip through the stream to avoid presentation of at least a portion of at least one of the one or more advertisements,
      facilitate presentation of one or more portions of the one or more advertisements that are not selectively skipped,
      track the presented portions of the one or more advertisements via a counter that is incremented when the presented portion of a particular advertisement reaches a predetermined duration that is less than a whole duration of the advertisement, and
      generate tracking information based on the counter.

6. An apparatus according to claim 5, wherein the tracking information is transmitted to a platform configured to deliver the stream.

7. An apparatus according to claim 6, wherein the platform is configured to provide virtual digital asset management of the digital media for operation with a workflow application, and the workflow application includes proxy viewing, logging and editing, craft editing, and delivery of the digital media.

8. An apparatus according to claim 5, wherein the digital media represents a live feed.

9. A system for controlling digital media, the system comprising:
  a media server configured to transmit a stream of digital media that includes one or more advertisements to a media player, wherein the media player is configured to selectively skip through the stream to avoid presentation of at least a portion of at least one of the one or more advertisements, and to present one or more portions of the one or more advertisements that are not selectively skipped; and
  an asset manager configured to track the presented portions of the one or more advertisements via a counter that is incremented when the presented portion of a particular advertisement reaches a predetermined duration that is less than a whole duration of the advertisement presented by the media player.

10. A system according to claim 9, wherein the asset manager is further configured to receive tracking information, corresponding to the amount of advertisement played back, from the media player.

11. A system according to claim 10, wherein the asset manager is configured to provide management of the digital media for operation with a workflow application, and the workflow application includes proxy viewing, logging and editing, craft editing, and delivery of the digital media.

12. A system according to claim 9, wherein the digital media represents a live feed.

13. A method for controlling digital media, the method comprising:
  receiving a digital media stream that includes one or more of a plurality of advertisements;
  selectively skipping through the digital media stream to skip at least a portion of the one or more advertisements included in the digital media stream;
  tracking a presented portion for each of the one or more advertisements included in the digital media stream; and
  incrementing a counter according to a number of the one or more advertisements included in the digital media stream that have been presented, wherein the counter is incremented based on one or more predetermined criteria including a length of the presented portion for each of the one or more advertisements included in the digital media stream.

14. An apparatus for controlling digital media, the apparatus comprising:
  a communication interface configured to receive a digital media stream that includes one or more of a plurality of advertisements; and
  a processor coupled to the communication interface, the processor configured to selectively skip through the digital media stream to skip at least a portion of the one or more advertisements included in the digital media stream, to track a presented portion for each of the one or more advertisements included in the digital media stream, and to increment a counter according to a number of the one or more advertisements included in the digital media stream that have been presented, wherein the counter is incremented based on one or more predetermined criteria including a length of the presented portion for each of the one or more advertisements included in the digital media stream.

15. A system for controlling digital media, the system comprising:
  a media server configured to transmit a digital media stream that includes one or more of a plurality of advertisements to a media player, wherein the media player is configured to present the digital media stream, to selectively skip through the digital media stream to skip at least a portion of the one or more advertisements included in the digital media stream, to track a presented portion for each of the one or more advertisements included in the digital media stream, and to increment a counter according to a number of the one or more advertisements included in the digital media stream that have been presented, wherein the counter is incremented based on one or more predetermined criteria including a length of the presented portion for each of the one or more advertisements included in the digital media stream; and
  an asset manager configured to receive tracking information from the media player, the tracking information including a value of the counter, and to manage content of the digital media stream based on the tracking information.

* * * * *